Patented Apr. 29, 1947

2,419,690

UNITED STATES PATENT OFFICE 2,419,690

CONVERSION OF HYDROCARBONS

Herman Pines and Vladimir N. Ipatieff, Riverside, Ill., assignors to Universal Oil Products Company, Chicago, Ill., a corporation of Delaware No Drawing. Application May 31, 1944, Serial No. 538,206

9 Claims. (Cl. 260—666)

This application is a continuation-in-part of our copending application Serial No. 496,618 filed July 29, 1943.

The present invention relates to the production of poly-alkylated compounds from non-aromatic organic compounds.

More specifically this invention relates to the conversion of non-aromatic cyclic compounds containing at least one double bond or potential double bond per molecule to poly-alkylated aromatic and naphthenic hydrocarbons.

We have discovered that by contacting a non-aromatic cyclic compound containing at least one double bond or potential double bond per molecule with various catalytic materials, we can effect a reaction heretofore unknown to those skilled in the art of organic chemistry. This discovery is of great importance at the present time in that the reaction products can be utilized as the starting material in many organic syntheses to produce compounds which are valuable in the manufacture of explosives, plastics, varnish resins, dyes, etc. The poly-alkylated aromatic compounds formed by the process of our invention as, for example, tetramethyl benzene, may be reacted with benzene under conditions such that alkyl transfer will occur to produce toluene. Similarly, the alkylated naphthenes containing 6 carbon atoms in the ring nucleus can be dehydrogenated to form the corresponding aromatic hydrocarbons which can again be employed as above to form mono-alkylated aromatics and preferably toluene.

It is an object of the present invention to provide a process whereby less valuable non-aromatic cyclic compounds are converted to more valuable cyclic compounds or intermediate materials from which compounds of increased usefulness may be produced.

For the purposes of the present specification and claims, the non-aromatic cyclic compounds containing at least one double bond or potential double bond per molecule are designated as unsaturated non-aromatic cyclic compounds. This designation is to be interpreted as describing compounds containing at least 8 carbon atoms per molecule and which under the conditions of our invention, either contain a double bond between two carbon atoms or are capable of forming such an unsaturated carbon to carbon linkage during the course of the reaction. In the case of a dicyclic compound containing a potential double bond, the reaction is most effectively performed when one of the rings contains not more than four carbon atoms.

Compounds which meet the specifications of the definition and which are utilizable in this process include alkylated cyclic or poly-cyclic organic compounds having a double bond in the ring or in the side chain. Compounds having a potential double bond are those which under the conditions of the present process can be converted to a cyclic compound having a double bond between two carbon atoms and include such compounds as pinane, thujane, carane, etc., cyclic alcohols such as menthol, cyclic halides such as menthyl chloride, etc.

Another type of compound which may be included in the charging materials for the present process is one which does not contain an actual or potential double bond but which may form a double bond between two carbon atoms in situ. For example, this may be effected by reacting a hydrocarbon such as menthane in the presence of alumina, hydrogen chloride and chlorine or, by reacting menthane with an olefinic hydrocarbon such as ethylene, the latter acting as a hydrogen acceptor with menthane in the role of the hydrogen donor.

In a broad aspect, our invention comprises the preparation of a poly-alkylated aromatic compound by reacting a non-aromatic unsaturated cyclic organic compound in the presence of a difficultly reducible metal oxide and a hydrogen halide.

In one embodiment the present invention relates to the production of a poly-alkylated aromatic hydrocarbon and a poly-alkylated naphthenic hydrocarbon by reacting a non-aromatic unsaturated cyclic hydrocarbon in the presence of a refractory metal oxide and a hydrogen halide.

In a more specific embodiment this invention relates to the manufacture of a poly-alkylated aromatic hydrocarbon by reacting a terpene hydrocarbon in the presence of a catalyst comprising at least one refractory metal oxide selected from the group consisting of alumina, thoria, silica, zirconia and titania and a hydrogen halide.

The catalytic materials which may be effectively employed in our process include such difficultly reducible metal oxides as alumina, thoria, silica, zirconia and titania, either alone or in admixture with one another.

The charging stock for the process includes any non-aromatic unsaturated cyclic organic compound of the type hereinbefore defined which contains either a double bond or a potential double bond between two carbon atoms. Particularly suitable materials for conversion in the process include such hydrocarbons as limonene, pinene, pinane, thujane, etc., and compounds such as terpenylhalides, hydrated terpenes, etc.

The temperature at which the reaction takes place will vary depending upon the particular material charged and the catalyst employed but will ordinarily be within the range of about 100 to about 450° C. and preferably within the range of about 250 to about 400° C. Pressure may be subatmospheric, atmospheric or moderately superatmospheric up to about 1,000 pounds per square inch or more. Space velocities employed vary with the temperature at which the conversion is effected.

The hydrogen halide concentration within the reaction zone will also vary in accordance with the charge, contact material and hydrogen halide employed but will ordinarily be below two mols of hydrogen halide per mol of hydrocarbon. When hydrogen chloride is the hydrogen halide used, a concentration of about 0.01 to 1.0 mols of hydrogen chloride per mol of hydrocarbon is usually employed. If an organic halide is employed in the reaction, the hydrogen halide may be generated in situ, thus obviating the necessity of adding hydrogen halide from an outside source.

The operation of our process may be conducted in a number of ways; for example, the charging material and the desired amount of hydrogen halide may be passed through a reaction zone containing the metal oxide in the form of small pellets or granules disposed in fixed bed relationship to the incoming reactants.

Another method which may be used is the "fluidized" operation in which the charge is passed upwardly through a body of finely divided catalyst material causing the particles to be kept in constant motion and forming a fluid-like mass. The catalyst is continuously withdrawn from the reaction zone, regenerated and returned thereto.

Still another type of operation comprises the "moving bed" process in which the compact bed of catalyst may be continuously passed through the reaction zone concurrently or countercurrently to the incoming reactants and passed therefrom into a regeneration zone from which it is returned to the reaction zone after having been regenerated by the combustion of carbonaceous materials deposited therein during the conversion reaction.

Another alternative mode of operation comprises suspending the catalyst in a stream of charge and treating said suspension under suitable conditions of temperature and pressure to produce the desired conversion reaction.

After completion of the reaction, the products are separated in suitable equipment wherein unconverted material is separated from the desired products and recycled to the reaction zone.

The following examples are given to illustrate the process of our invention but they are not to be considered as limiting the generally broad scope of the invention in accordance with the data submitted.

Example I 180 grams of limonene was passed over 87 grams of alumina at an hourly liquid space velocity of 1.07. Hydrogen chloride was passed over the alumina simultaneously with the hydrocarbon, in an amount equal to one mol of hydrogen chloride per mol of hydrocarbon. The temperature was maintained at 300° C. The reaction yielded 79.8 weight per cent of liquid product of which 62 per cent comprised alkylated aromatics containing mainly tetramethylated benzene and 35 per cent alkylated naphthenes (chiefly alkylated cyclohexane) while the remaining 3 per cent comprised olefins.

Example II

Pinane was reacted in the presence of alumina and hydrogen chloride according to the procedure outlined in Example I. One mol of hydrogen chloride per mol of pinane was employed. The reaction products comprised mainly polymethylated hydrocarbons and contained a major proportion of durene (1,2,4,5-tetramethylbenzene) which had a melting point of 79° C. The remaining products consisted chiefly of polymethylated cyclohexane.

We claim as our invention:

1. A process for producing a poly-alkylated cyclic compound from a non-aromatic unsaturated cyclic compound containing at least 8 carbon atoms per molecule which comprises subjecting said non-aromatic unsaturated cyclic compound at a reaction temperature of from about 100° C. to about 450° C. in the presence of a hydrogen halide to the action of a catalyst consisting essentially of at least one refractive oxide selected from the group consisting of alumina, thoria, silica, zirconia and titania.

2. A process for producing a poly-alkylated aromatic hydrocarbon and a naphthenic hydrocarbon from a non-aromatic unsaturated cyclic hydrocarbon containing at least 8 carbon atoms per molecule which comprises subjecting said non-aromatic unsaturated cyclic hydrocarbon at a reaction temperature of from about 100° C. to about 450° C. in the presence of a hydrogen halide to the action of a catalyst consisting essentially of at least one refractive oxide selected from the group consisting of alumina, thoria, silica, zirconia and titania.

3. A process for producing a poly-alkylated aromatic compound from a non-aromatic unsaturated cyclic compound containing at least 8 carbon atoms per molecule which comprises subjecting said non-aromatic unsaturated cyclic compound at a reaction temperature of from about 100° C. to about 450° C. in the presence of hydrogen chloride to the action of a catalyst consisting essentially of at least one refractive oxide selected from the group consisting of aluminia, thoria, silica, zirconia and titania.

4. A process for producing a poly-alkylated aromatic compound from a non-aromatic unsaturated cyclic compound containing at least 8 carbon atoms per molecule which comprises subjecting said non-aromatic unsaturated cyclic compound at a reaction temperature of from about 100° C. to about 450° C. to the action of hydrogen chloride and a catalyst consisting essentially of alumina.

5. A process for producing a poly-alkylated aromatic compound and a poly-alkylated naphthenic compound from a non-aromatic unsaturated cyclic compound containing at least 8 carbon atoms per molecule which comprises subjecting said non-aromatic unsaturated cyclic compound at a temperature in the range of about 100 to about 450° C. in the presence of a hydrogen halide to the action of a catalyst consisting essentially of at least one refractive metal oxide selected from the group consisting of alumina, thoria, silica, zirconia and titania.

6. The process as defined in claim 4 further characterized in that said non-aromatic cyclic compound is limonene.

7. The process as defined in claim 4 further characterized in that said non-aromatic cyclic compound is pinene.

8. The process for producing a poly-alkylated cyclic compound which comprises subjecting a cyclic terpene compound at a reaction temperature of from about 100° C. to about 450° C. in the presence of a hydrogen halide to the action of a catalyst consisting essentially of at least one refractive oxide selected from the group consisting of alumina, boria, silica, zirconia and titania.

9. The process as defined in claim 8 further characterized in that said said cyclic terpene compound is pinane.

HERMAN PINES.
VLADIMIR N. IPATIEFF.

REFERENCES CITED

The following references are of record in the file of this patent:

UNITED STATES PATENTS

| Number | Name | Date |
| --- | --- | --- |
| 1,691,069 | Humphrey | Nov. 13, 1938 |
| 1,244,444 | McKee | Oct. 23, 1917 |
| 1,691,473 | Humphrey | Nov. 13, 1928 |
| 1,893,802 | Humphrey | Jan. 10, 1933 |
| 2,272,711 | Hull | Feb. 10, 1942 |
| 2,337,191 | Greensfelder | Dec. 21, 1943 |
| 2,219,345 | Thiele et al. | Oct. 29, 1940 |

OTHER REFERENCES

Foutala, "Angew. Chem.," 45, 588 (1932), cited in Egloff, "Reactions of Pure Hydrocarbons," pp. 800–801.

Copyright 1937 by Reinhold Publishing Corp., N. Y.

Egloff, "Reactions of Pure Hydrocarbons," page 814. Copyright 1937 by Reinhold Publishing Corp., New York.